United States Patent
Miyake

(10) Patent No.: US 12,459,840 B2
(45) Date of Patent: Nov. 4, 2025

(54) HYDROGEN ADDITION DEVICE AND HYDROGEN ADDITION METHOD

(71) Applicant: NIHON TRIM CO., LTD., Osaka (JP)

(72) Inventor: Masato Miyake, Osaka (JP)

(73) Assignee: NIHON TRIM CO., LTD., Osaka (JP)

( * ) Notice: Subject to any disclaimer, the term of this patent is extended or adjusted under 35 U.S.C. 154(b) by 736 days.

(21) Appl. No.: 17/783,968

(22) PCT Filed: Jan. 19, 2021

(86) PCT No.: PCT/JP2021/001691
§ 371 (c)(1),
(2) Date: Jun. 9, 2022

(87) PCT Pub. No.: WO2021/157338
PCT Pub. Date: Aug. 12, 2021

(65) Prior Publication Data
US 2022/0388876 A1    Dec. 8, 2022

(30) Foreign Application Priority Data
Feb. 3, 2020    (JP) .................................. 2020-016534

(51) Int. Cl.
C02F 1/461    (2023.01)
A61M 1/16    (2006.01)
A61M 1/28    (2006.01)
C02F 103/02    (2006.01)

(52) U.S. Cl.
CPC ........ *C02F 1/46104* (2013.01); *C02F 1/4618* (2013.01); *A61M 1/166* (2014.02); *A61M 1/287* (2013.01); *C02F 2103/026* (2013.01); *C02F 2201/46155* (2013.01)

(58) Field of Classification Search
CPC .................................................... C02F 1/4618
See application file for complete search history.

(56) References Cited

U.S. PATENT DOCUMENTS 8,460,861 B2 * 6/2013 Satoh ...................... A61P 17/18
435/2
2013/0245540 A1    9/2013    Satoh
2016/0089394 A1    3/2016    Satoh

FOREIGN PATENT DOCUMENTS

| CN | 101932297 A | 12/2010 |
| CN | 107635927 A | 1/2018 |
| JP | 4486157 B1 | 6/2010 |
| JP | 5940753 B1 | 6/2016 |

(Continued)

OTHER PUBLICATIONS

Machine translation of WO2017043432 (Year: 2017).*

*Primary Examiner* — Brian W Cohen
(74) *Attorney, Agent, or Firm* — Muncy, Geissler, Olds & Lowe, P.C.

(57) ABSTRACT

A hydrogen addition device adds hydrogen to a biocompatible solution of a liquid containing body formed by the biocompatible solution sealed in a molecular hydrogen permeable container. The hydrogen addition device is provided with a tank for housing the unopened liquid containing body, a hydrogen water generator for producing dissolved hydrogen water formed by water with hydrogen dissolved therein to supply to the tank, and a heating portion for heating the dissolved hydrogen water in the tank to warm the biocompatible solution of the liquid containing body.

8 Claims, 5 Drawing Sheets

(56) References Cited

FOREIGN PATENT DOCUMENTS

| JP | 2017-158611 A | 9/2017 |
|----|---------------|--------|
| WO | 2017043432 A1 | 3/2017 |
| WO | 2020184181 A1 | 9/2020 |

* cited by examiner

HYDROGEN ADDITION DEVICE AND HYDROGEN ADDITION METHOD

FIELD OF THE INVENTION

The present invention relates to a device and method for adding hydrogen to a biocompatible solution.

BACKGROUND ART

A method of producing a hydrogen-containing biocompatible solution by substantially adding molecular hydrogen in a biocompatible solution sealed in a container having molecular hydrogen permeability has been proposed (see, Patent Literature 1, for example).

PRIOR ART DOCUMENT

Patent Literature

[Patent Literature 1] Japanese Patent Publication No. 4486157

SUMMARY OF THE INVENTION

Problems to be Solved by the Invention

In the above method, hydrogen is added to the biocompatible solution by contacting molecular hydrogen from the outside of the container without opening the container in which the biocompatible solution is sealed. Hydrogen-containing biocompatible solutions have been attracting attention in recent years for a reduced burden on living organisms.

However, even with the biocompatible solution described above, if the temperature is significantly lower than the body temperature of the living body, the burden on the living body may be inescapable. Therefore, in order to further reduce the burden on the living body, the biocompatible solution needs to be heated separately, which is cumbersome.

The present invention was made in view of the above, and a primary object thereof is to provide a hydrogen addition device and method for easily preparing a biocompatible solution with further reduced burden on a living body.

Means for Solving the Problem

The first invention of the present invention is a hydrogen addition device for adding hydrogen to a biocompatible solution of a liquid containing body formed by the biocompatible solution sealed in a molecular hydrogen permeable container, including a tank for housing the liquid containing body being unopened, a hydrogen water generator for producing dissolved hydrogen water formed by water with hydrogen dissolved therein to supply to the tank, and a heating portion for heating the dissolved hydrogen water in the tank to warm the biocompatible solution in the liquid containing body.

It is preferred that the hydrogen addition device according to the present invention further includes a temperature sensor for detecting temperature of the dissolved hydrogen water, wherein when the liquid containing body is present in the tank, the heating portion heats the dissolved hydrogen water to a first temperature, and when the liquid containing body is absent in the tank, the heating portion heats the dissolved hydrogen water to a second temperature higher than the first temperature.

In the hydrogen addition device according to the present invention, it is preferred that the hydrogen water generator increases a dissolved hydrogen concentration of the dissolved hydrogen water while circulating the dissolved hydrogen water to and from the tank.

In the hydrogen addition device according to the present invention, it is preferred that the hydrogen water generator and the heating portion are configured so that the increase in the dissolved hydrogen concentration of the dissolved hydrogen water by the hydrogen water generator and the heating of the dissolved hydrogen water by the heating portion are performable simultaneously, at least in part.

It is preferred that the hydrogen addition device according to the present invention further includes a drainage tank for storing the dissolved hydrogen water discharged from the tank.

It is preferred that the hydrogen addition device according to the present invention further includes a main body portion for housing the tank, the hydrogen water generator, the heating portion, and the drainage tank, wherein the drainage tank is configured to be attachable to and detachable from the main body portion.

The second invention of the present invention is a hydrogen addition method for adding hydrogen to biocompatible solution in a liquid containing body formed by the biocompatible solution sealed in a molecular hydrogen permeable container, including a housing step of housing the liquid containing body being unopened in a tank, a hydrogen water supply step of generating dissolved hydrogen water formed by water with hydrogen dissolved therein, and a heating step of heating the dissolved hydrogen water in the tank to warm the biocompatible solution in the liquid containing body.

In the hydrogen addition method according to the present invention, it is preferred that the hydrogen water supply step and the heating step are performed simultaneously, at least in part.

Advantageous Effects of the Invention

In the hydrogen addition device according to the first invention, the hydrogen water generator produces the dissolved hydrogen water to supply to the tank. And the heating portion heats the dissolved hydrogen water in the tank to warm the biocompatible solution in the liquid containing body. Thereby, it is possible that the biocompatible solution which can further reduce the burden on a living body is prepared easily.

The hydrogen addition method according to the second invention includes the hydrogen water supply step of generating the dissolved hydrogen water formed by water with hydrogen dissolved therein, and the heating step of heating the dissolved hydrogen water in the tank to warm the biocompatible solution in the liquid containing body. Thereby, it is possible that the biocompatible solution which can further reduce the burden on a living body is prepared easily.

DETAILED DESCRIPTION OF THE INVENTION

An embodiment of the present invention will now be described in conjunction with accompanying drawings.

Figure 1:
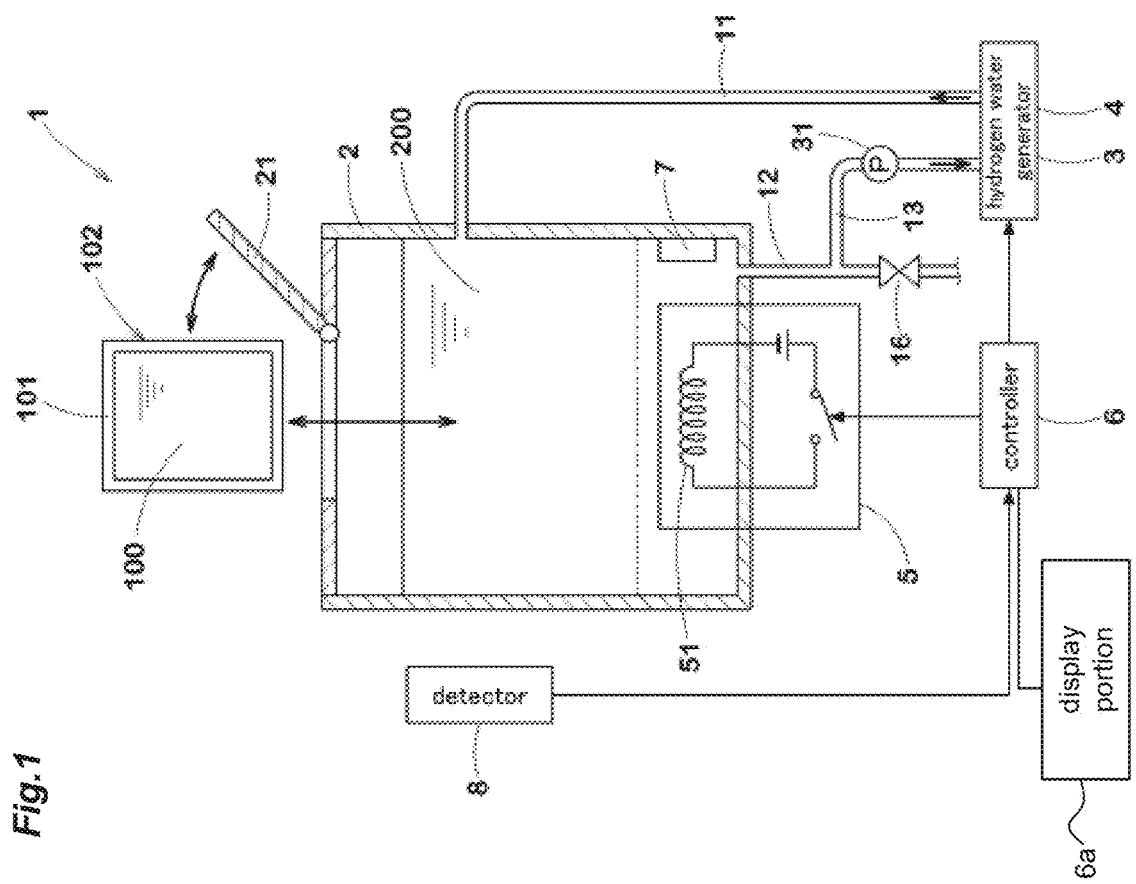
FIG. 1 a schematic diagram of the hydrogen addition device of the present invention.
Figure 2:
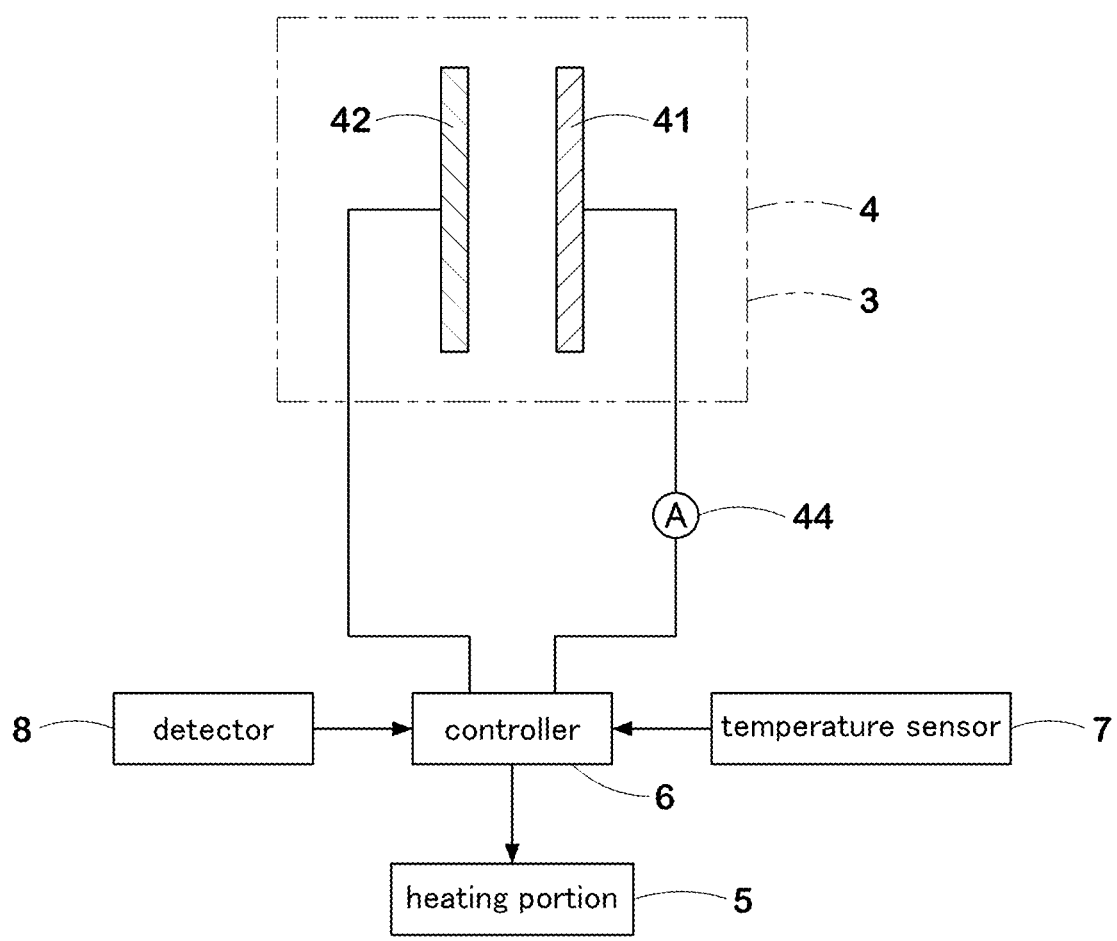
FIG. 2 a block diagram showing the electrical configuration of the hydrogen addition device shown in FIG. 1.

FIG. 1 shows a configuration of a hydrogen addition device 1. FIG. 2 shows an electrical configuration of the hydrogen addition device 1. The hydrogen addition device 1 is a device for adding (to contain) hydrogen to the biocompatible solution 100.

The term "biocompatible solution" is a concept that refers to all liquids that are applied parenterally to the body with the intention of maintaining and improving biological functions or preventing or treating disease or illness. The biocompatible solution includes osmotic-prepared saline for applications such as injections, drip infusions, and transfusions; injectable solutions prepared for nutrient and electrolyte supplementation; injectable solutions and saline solutions in which drugs (including vasodilators such as prostaglandins and anticancer drugs) are dissolved; liquid drug; transfusion products (blood for transfusion) and autologous blood used for transfusion; enteral liquid; and further organ preservation solutions formulated for the preservation of organs; biocompatible solutions containing lymphocytes and vaccines used in cancer immunotherapy, vaccine therapy, and the like; peritoneal dialysate, dialysate solution, cardioprotective drugs, and so on. Further, in the present specification, the term "biocompatible solution" may also refer to the biological fluid of a living body or biological water itself.

The hydrogen addition device 1 of the present embodiment is particularly suitable for adding hydrogen to peritoneal dialysis solution out of biocompatible solution 100. Peritoneal dialysis using hydrogen-added peritoneal dialysate has been attracting attention in recent years for contribution thereof to reducing oxidative stress in patients.

The biocompatible solution 100 is sealed in a container 101 permeable to molecular hydrogen. Polymeric materials such as polyethylene, polypropylene, and polystyrene, for example, are preferred as materials for the container 101, but are not limited to the above as long as the materials are molecular hydrogen permeable. For example, even materials characterized by oxygen gas barrier properties or water vapor barrier properties can, in many cases, permeate hydrogen molecules with small molecular size without problems.

The biocompatible solution 100 may be in a form that is separated into a first solution and a second solution in the container 101 and mixed during dialysis.

The container 101 should be bag-shaped, for example, but is not limited to this, and may be bottle-shaped, for example, if permeability of molecular hydrogen is maintained. As molecular hydrogen permeates the outer wall of container 101, biocompatible solution 100 becomes a liquid containing molecular hydrogen.

The hydrogen addition device 1 is a device for adding hydrogen to the biocompatible solution 100 in a liquid containing body 102 having the biocompatible solution 100 sealed in the container 101.

The hydrogen addition device 1 has a tank 2 for accommodating the liquid containing body 102, a hydrogen water generator 3 for generating dissolved hydrogen water 200 which is water with hydrogen dissolved therein, and a heating portion 5 for heating the dissolved hydrogen water in the tank 2.

Tank 2 contains the unopened liquid containing body 102. The tank 2 is supplied with the dissolved hydrogen water 200 produced by the hydrogen water generator 3. Hydrogen is added to the biocompatible solution 100 as molecular hydrogen dissolved in the dissolved hydrogen water 200 permeates the container 101.

The hydrogen water generator 3 dissolves molecular hydrogen in water to produce the dissolved hydrogen water 200 and supplies the produced dissolved hydrogen water 200 to the tank 2. The hydrogen water generator 3 in the present embodiment includes an electrolytic cell 4 that produces the dissolved hydrogen water 200 by electrolyzing water.

The hydrogen water generator 3 and the tank 2 are connected by a water channel 11. The dissolved hydrogen water 200 produced by the hydrogen water generator 3 is supplied to the tank 2 via the water channel 11.

The heating portion 5 heats the dissolved hydrogen water 200 stored in the tank 2. The heating portion 5 has, for example, a heater 51 that is powered by electric power. The heater 51 heats the biocompatible solution 100 in the liquid containing body 102 by heating the dissolved hydrogen water 200 stored in the tank 2 by generating heat due to Joule heat. This makes it possible to easily prepare the biocompatible solution 100 that can further reduce the burden on the living body.

The hydrogen water generator 3 and the heating portion 5 are controlled by a controller 6, for example. The controller 6 has a CPU (Central Processing Unit), a memory, and so on, for example. The CPU executes various arithmetic processing, information processing, and the like. The memory stores programs that control the operation of the CPU and various information. The controller 6 controls the heating portion 5, the hydrogen water generator 3, and other parts of the device.

The hydrogen addition device 1 is further provided with a temperature sensor 7 for detecting the temperature of the dissolved hydrogen water 200. The temperature sensor 7 is provided in the tank 2, for example. The location of the temperature sensor 7 is not limited as long as the temperature of the dissolved hydrogen water 200 can be detected directly or indirectly. The temperature sensor 7 may be provided in the water channel 11, and the like, for example.

The temperature sensor 7 outputs an electrical signal corresponding to the temperature of the dissolved hydrogen water 200 to the controller 6. The controller 6 controls the heating portion 5 based on the electrical signal from the temperature sensor 7. Thereby, the temperature of the dissolved hydrogen water 200 is regulated.

It is preferred that the temperature of the dissolved hydrogen water 200 is controlled based on the presence or absence of the liquid containing body 102 in the tank 2. The presence or absence of the liquid containing body 102 is detected by a detector 8, for example.

The detector 8 detects the presence or absence of the liquid containing body 102 in the tank 2 by, for example, transmitting ultrasonic or radio waves into the tank 2 and detecting the reflected waves from the liquid containing body 102. The detector 8 outputs an electrical signal to the controller 6 regarding the presence or absence of the liquid containing body 102. The controller 6 controls the heating portion 5 based on the electrical signal from the detector 8 to heat the dissolved hydrogen water 200 to a predetermined temperature.

Under the control by the controller 6, for example, when the liquid containing body 102 is present in the tank 2, the heating portion 5 heats the dissolved hydrogen water 200 to a first temperature. As a result, the biocompatible solution 100 in the liquid containing body 102 is also warmed up to the first temperature.

The first temperature can be, for example, a temperature that approximates the body temperature of the living body to which the biocompatible solution 100 is applied, e.g., 36° C. to 38° C. if the living body is human. This further reduces the burden on the living body.

On the other hand, when the liquid containing body 102 is not present in the tank 2, the heating portion 5 heats the dissolved hydrogen water 200 to a second temperature. The second temperature is higher than the first temperature. The inside of the tank 2 is sterilized by the dissolved hydrogen water 200 heated to the second temperature. The second temperature suitable for sterilization is 60° C. to 100° C., for example.

For sterilization in the tank 2, it is preferred to use the dissolved hydrogen water 200 after supplying hydrogen to the biocompatible solution 100, but it can also be a liquid supplied separately to the tank 2.

The hydrogen water generator 3 and the tank 2 are connected by a water channel 12 and a water channel 13 described below, in addition to the water channel 11 described above. The dissolved hydrogen water 200 in the tank 2 passes through the water channels 12 and 13 and returns to the hydrogen water generator 3. The water channels 11, 12, and 13 form a waterway through which the dissolved hydrogen water 200 circulates between the hydrogen water generator 3 and the tank 2.

It is preferred that the hydrogen water generator 3 includes a pump 31 for delivering the dissolved hydrogen water 200. In the present embodiment, the pump 31 is provided in the water channel 13. The pump 31 may be provided in the water channel 11 or 12. The pump 31 pumps out the dissolved hydrogen water 200, thereby, the dissolved hydrogen water 200 circulates in the water channels 11, 12, and 13.

The pump 31 is controlled by the controller 6, for example. By the controller 6 synchronizing the operation of the electrolytic cell 4 with the operation of the pump 31, the hydrogen water generator 3 is able to increase a dissolved hydrogen concentration of the dissolved hydrogen water 200 while circulating the dissolved hydrogen water 200 to and from the tank 2, making it possible to easily generate the dissolved hydrogen water 200 with the dissolved hydrogen concentration of 300 ppb or higher, for example. In this way, the amount of hydrogen added to the biocompatible solution 100 is increased, thereby, the burden on the living body is further reduced.

It is preferred that the high hydrogen concentration of the dissolved hydrogen water 200 by the hydrogen water generator 3 and the heating of the dissolved hydrogen water 200 by the heating portion 5 can be performed simultaneously, at least in part. In this case, the operation of the hydrogen water generator 3 may be performed first, or the operation of the heating portion 5 may be performed first. Therefore, it is possible that the biocompatible solution 100 with further reduced burden on the living body is prepared in a short time.

When sterilizing the inside of the tank 2, the dissolved hydrogen water 200 may also be circulated by the pump 31. Thereby, the water channels 11, 12, 13 and the hydrogen water generator 3 are easily sterilized.

Figure 3:
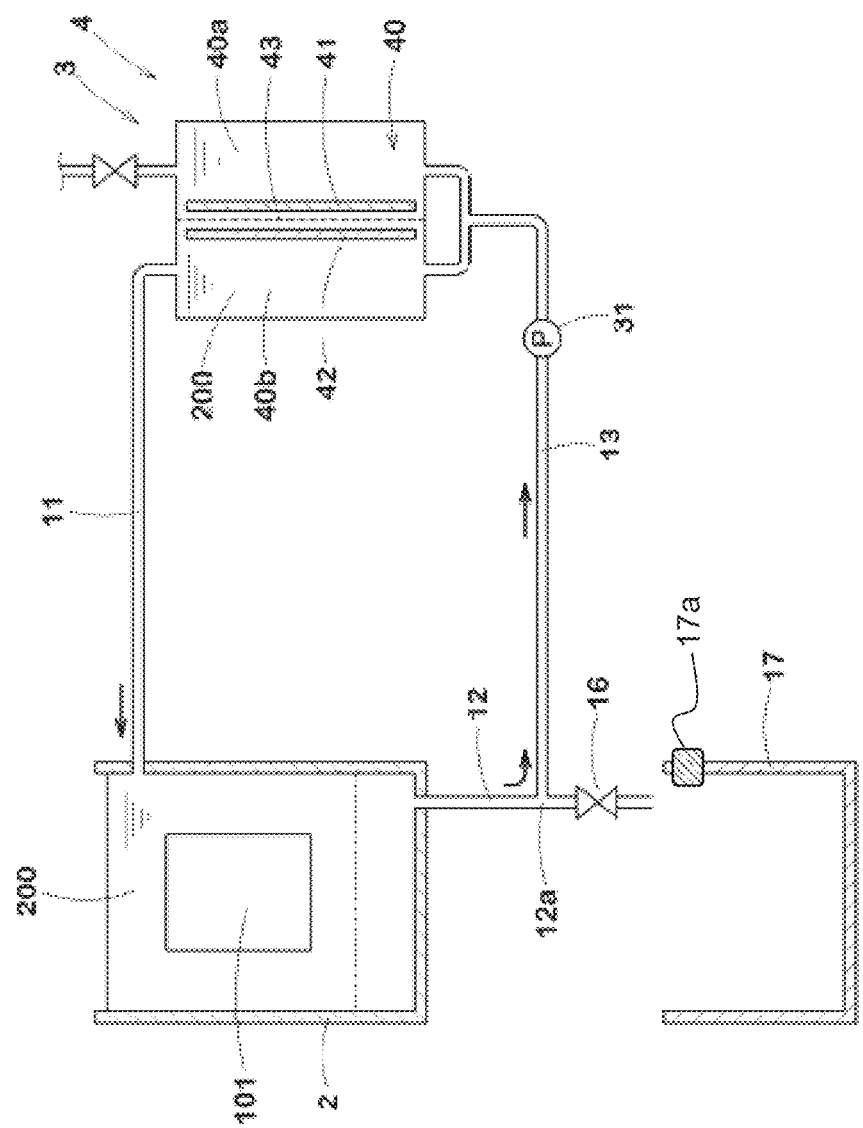
FIG. 3 a tank and an electrolytic cell as an example of a hydrogen water generator.

FIG. 3 shows the tank 2 and the electrolytic cell 4 as an example of the main part of the hydrogen water generator 3. The electrolytic cell 4 has an electrolytic chamber 40 with a first power feeder 41 and a second power feeder 42 arranged in the electrolytic chamber 40.

A diaphragm 43 is provided between the first power feeder 41 and the second power feeder 42. The electrolytic chamber 40 is divided by the diaphragm 43 into a first pole chamber (40a) with the first power feeder 41 arranged therein and a second pole chamber (40b) with the second power feeder 42 arranged therein.

The electrolytic cell 4 of the present embodiment is controlled by the controller 6. The controller 6 controls the DC voltage to be applied to the first power feeder 41 and the second power feeder 42 based on the electrical signal output from a current detector 44 (see FIG. 2), for example. More specifically, the controller 6 feedback controls the DC voltage applied to the first power feeder 41 and the second power feeder 42 so that the electrolytic current detected by the current detector 44 is at a preset and desired value. For example, if the electrolytic current is excessive, the controller 6 decreases the above-described voltage, and if the electrolytic current is insufficient, the controller 6 increases the above-described voltage. In this manner, the electrolytic currents supplied to the first power feeder 41 and the second power feeder 42 are properly controlled.

The electrolysis of water in the electrolytic chamber 40 produces hydrogen and oxygen gases. For example, in the second pole chamber (40b) on the cathode side, hydrogen gas is generated and dissolved hydrogen water 200 is produced in which the generated hydrogen molecules are dissolved. It should be noted that the dissolved hydrogen water 200 produced by the electrolysis as described above is also referred to as "electrolytic hydrogen water". On the other hand, oxygen gas is generated in the first pole chamber (40a) on the anode side.

The water channel 11 connects the second pole chamber (40B) and the tank 2. The dissolved hydrogen water 200 produced in the second pole chamber (40b) is supplied to the tank 2 via the water channel 11.

The water channel 12 is provided to extract the dissolved hydrogen water 200 from within the tank 2. The water channel 12 is connected to the water channel 13. The water channel 13 branches off from the water channel 12 at a branch point (12a) and extends to the electrolytic cell 4.

In the water channel 12, a valve 16 is provided downstream of the branch point (12a) where the water channel 13 branches off. The valve 16 is controlled by the controller 6. During operation of the hydrogen water generator 3, the controller 6 closes the valve 16. With the valve 16 closed, the dissolved hydrogen water 200 in the tank 2 is supplied to the electrolytic chamber 40 via the water channels 12 and 13.

The electrolytic cell 4 generates molecular hydrogen by electrolyzing the water supplied from the tank 2 via a portion of the water channel 12 and the water channel 13. The dissolution of the hydrogen molecules into the water produces the dissolved hydrogen water 200 supplied to the tank 2. It also increases the concentration of dissolved hydrogen in the dissolved hydrogen water 200.

A drainage tank 17 is provided at the end of the water channel 12. In the drainage tank 17, the dissolved hydrogen water 200 used for sterilization in the tank 2 is discharged and stored. As the controller 6 opens the valve 16, the dissolved hydrogen water 200 in the tank 2 passes through the water channel 12 to the drainage tank 17.

The dissolved hydrogen water 200 in the tank 2 may be reduced by opening the valve 16 for a predetermined duration prior to sterilization of the tank 2. This reduces the heating time of the dissolved hydrogen water 200. Even in this case, the hot steam generated by heating the dissolved hydrogen water 200 fills the tank 2, the water channels 11, 12, and 13, and the hydrogen water generator 3, so that the tank 2, etc. are properly sterilized.

Figure 4:
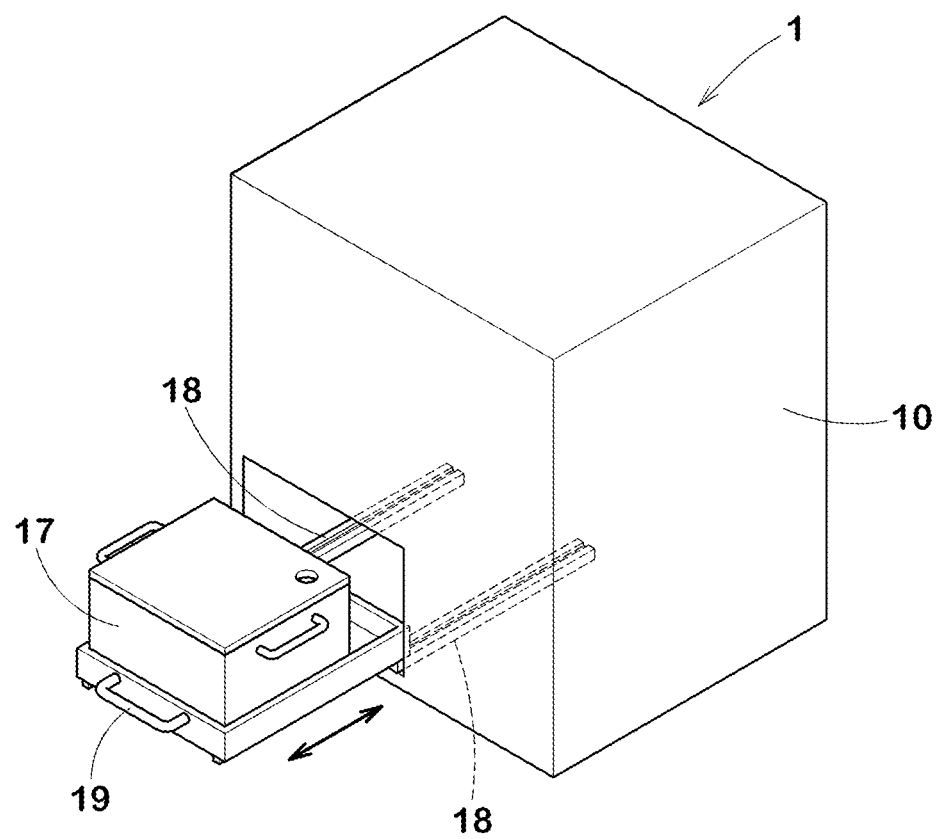
FIG. 4 a perspective view showing a main body portion and a drainage tank of the hydrogen addition device shown in FIG. 1.

FIG. 4 shows a main body portion 10 and the drainage tank 17 of the hydrogen addition device 1. The main body portion 10 houses the tank 2, the hydrogen water generator 3, the heating portion 5, and the drainage tank 17. The drainage tank 17 is configured to be detachable from and attachable to the main body portion 10. Main body portion 10 may be referred to as a housing in this application.

The main body portion 10 has a rail 18 for guiding the drainage tank 17 when the drainage tank 17 is attached or detached, for example. The drainage tank 17 is provided at the front thereof with a handle 19 for pulling out the drainage tank 17. Therefore, waste fluid disposal is easier and the usability of the hydrogen addition device 1 is improved.

Figure 5:
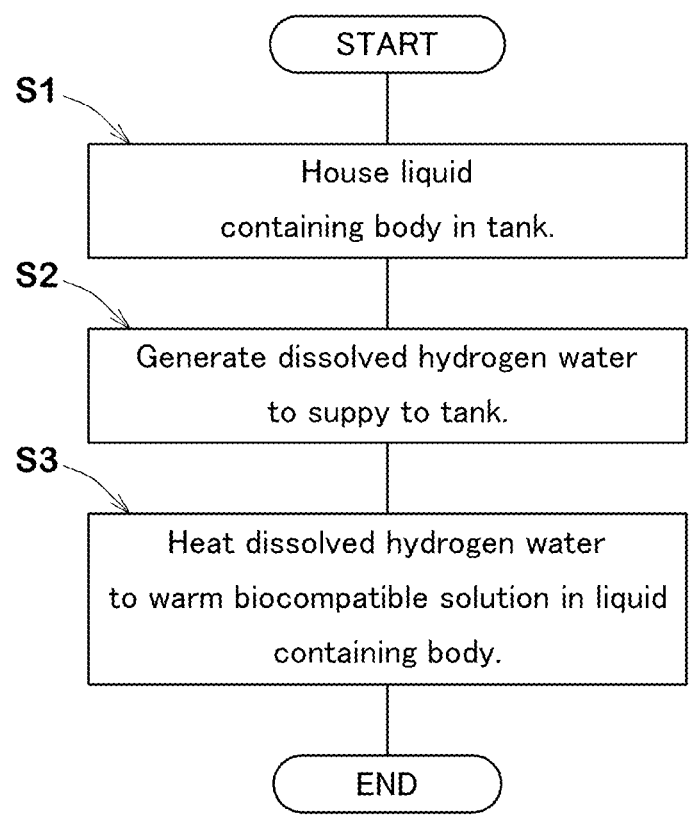
FIG. 5 A flowchart showing processing steps of the hydrogen addition method of the present invention.

FIG. 5 shows a hydrogen addition method for adding hydrogen to the biocompatible solution 100, by suitably using the hydrogen addition device 1. This is the hydrogen addition method for adding hydrogen to the biocompatible solution 100 in the liquid containing body which formed by the biocompatible solution 100 sealed in a molecular hydrogen permeable container 101.

The hydrogen addition method includes a housing step S1 wherein the unopened liquid containing body 102 is housed in the tank 2, a hydrogen water supply step S2 wherein the dissolved hydrogen water 200 formed by water having hydrogen dissolved therein is generated and supplied to the tank 2, and a heating step S3 wherein the dissolved hydrogen water 200 in the tank 2 is heated to warm the biocompatible solution 100 in the liquid containing body 102. In the hydrogen water supply step S2, the dissolved hydrogen water 200 is produced by electrolysis, and furthermore, its dissolved hydrogen concentration is increased, for example.

The housing step S1, the hydrogen water supply step S2 and the heating step S3 may be performed in any order. For example, after the hydrogen water supply step S2 and the heating step S3, the housing step S1 may be performed. Further, electrolysis may be performed in the hydrogen water supply step S2 after the water supplied to the tank 2 is heated in the heating step S3.

According to the present hydrogen addition method, it is possible to easily prepare the biocompatible solution 100 that can further reduce the burden on the living body.

It is preferred that the hydrogen water supply step S2 and the heating step S3 be performed simultaneously, at least in part. Thereby, it is possible that the biocompatible solution 100 capable of further reducing the burden on the living body is prepared in a short time.

While detailed description has been made of the hydrogen addition device 1 and the like according to the present invention, the present disclosure can be embodied in various forms without being limited to the illustrated embodiments. That is to say, the hydrogen addition device 1 is at least for adding hydrogen to the biocompatible solution 100 of the liquid containing body 102 formed by the biocompatible solution 100 sealed in the molecular hydrogen permeable container 101, and it suffices as long as the hydrogen addition device 1 includes the tank 2 for housing the liquid containing body 102 which is unopened, the hydrogen water generator 3 for producing the dissolved hydrogen water 200 which is water with hydrogen dissolved therein to supply to the tank 2, and the heating portion 5 for heating the dissolved hydrogen water 200 in the tank 2 to warm the biocompatible solution 100 of the liquid containing body 102.

Thereby, for example, besides the detector 8 detects the presence or absence of the liquid containing body 102 in the tank 2, the hydrogen addition device 1 may be configured so that the user and the like checks the presence or absence of the container 101, operates the hydrogen addition device 1 to input an electrical signal to the controller 6.

Further, for the tank 2 having a lid member 21 for putting in and taking out the container 101, the detector 8 may be configured to detect the presence or absence of the liquid containing body 102 in the tank 2 by detecting the open/close state of the lid member 21.

Furthermore, the hydrogen water generator 3 may be configured to supply hydrogen gas to the tank 2, for example. That is, the electrolytic cell 4 may be configured to supply hydrogen gas generated in the second pole chamber (40*b*) on the cathode side to the tank 2.

Still furthermore, the configuration of the hydrogen water generator 3 is not limited to have the electrolytic cell 4. For example, it may be a device that generates the dissolved hydrogen water 200 by dissolving molecular hydrogen generated by a chemical reaction between water and magnesium, etc., in water, or by dissolving hydrogen gas (molecular hydrogen) supplied from a hydrogen gas cylinder in water. Even in this case, the hydrogen water generator 3 may be configured to supply hydrogen gas to the tank 2.

In order to prevent operation of the hydrogen water generator 3 or the heating portion 5 when not enough water is supplied in the tank 2, a water volume sensor or the like may be provided to detect the amount of water in the tank 2. The water volume sensor is arranged inside or outside the tank 2 and outputs an electrical signal to the controller 6 according to the volume of water in the tank 2, for example. The controller 6 controls the hydrogen water generator 3 or the heating portion 5 based on the electrical signal from the water volume sensor. More specifically, the controller 6 may be configured not to perform the hydrogen water supply step S2 and the heating step S3 if the amount of water in the tank 2 is below a predetermined threshold.

Further, in order to prevent discharged water from flowing back from the full drainage tank 17, a water volume sensor 17*a* or the like may be provided to detect the amount of water in the drainage tank 17. The water volume sensor is arranged inside or outside the drainage tank 17 and outputs an electrical signal to the controller 6 according to the volume of water in the drainage tank 17, for example. FIG. 3 illustrates one embodiment in which the water volume sensor 17*a* is arranged outside the drainage tank 17. The water volume sensor may be configured to estimate the volume of water stored in the drainage tank 17 from the volume of water flowing through the water channel 12 from the valve 16 to the drainage tank 17, as well as to detect the weight of the drainage tank 17. The controller 6 controls the valve 16 based on the electrical signals from the water volume sensor. More specifically, the controller 6 closes the valve 16 when the drainage tank 17 is full. Subsequently, controller 6 may be configured to open the valve 16 when it is confirmed that the water in the drainage tank 17 has been disposed of and the drainage tank 17 which has a vacancy in capacity is attached.

Further, the main body portion 10 may be provided with a display portion 6*a*, such as a Liquid Crystal Display (LCD) and the like, for example, see FIG. 1. The display portion is controlled by the controller 6 and displays various types of information. The information displayed on the display portion includes, for example, the dissolved hydrogen concentration of the dissolved hydrogen water 200, the temperature (estimated temperature of the biocompatible solution 100), the presence or absence of the liquid containing body 102 in the tank 2, and the space available in the drainage tank 17. The display portion may be configured to update the above information in real time.

Furthermore, the hydrogen addition method of the hydrogen addition device 1 is at least the hydrogen addition method for adding hydrogen to the biocompatible solution 100 in the liquid containing body 102 formed by the biocompatible solution 100 sealed in the molecular hydrogen permeable container 101, and it suffices as long as the hydrogen addition method includes the housing step S1 of housing the liquid containing body 102 being unopened in the tank 2, the hydrogen water supply step S2 of generating the dissolved hydrogen water 200 formed by water with hydrogen dissolved therein to supply to the tank 2, and the heating step S3 of heating the dissolved hydrogen water 200 in the tank 2 to warm the biocompatible solution 100 in the liquid containing body 102.

For example, a sterilization step may be performed to sterilize the inside of the tank 2 after the housing step S1, the hydrogen water supply step S2, and the heating step S3.

DESCRIPTION OF THE REFERENCE SIGNS 1 hydrogen addition device
2 tank
3 hydrogen water generator
5 heating portion
7 temperature sensor
10 main body portion
17 drainage tank
100 biocompatible solution
101 container
102 liquid containing body
200 dissolved hydrogen water
S1 housing step
S2 hydrogen water supply step
S3 heating step

The invention claimed is:

1. A hydrogen addition device for adding hydrogen to a biocompatible solution of a liquid containing body formed by a molecular hydrogen permeable container and the biocompatible solution sealed therein, comprising:
   a tank for housing the liquid containing body being unopened;
   a hydrogen water generator for producing dissolved hydrogen water formed by water with hydrogen dissolved therein to supply to the tank;
   a heater for heating the dissolved hydrogen water in the tank to warm the biocompatible solution of the liquid containing body housed in the tank so as to contact with the dissolved hydrogen water;
   a drainage tank for storing the dissolved hydrogen water discharged from the tank;
   a valve, when opened, allowing the dissolved hydrogen water in the tank to be discharged to the drainage tank;
   a water volume sensor to detect whether or not the drainage tank is full;
   a housing configured to house the tank, the hydrogen water generator, the heater and the drainage tank;
   the housing provided with a rail for guiding the drainage tank when the drainage tank is housed in and taken out from the housing; and
   a controller for controlling the valve based on electrical signals from the water volume sensor such that the valve is opened for discharging if the drainage tank is not full, and the valve is closed if the drainage tank is full.

2. The hydrogen addition device according to claim 1 further comprising a temperature sensor for detecting temperature of the dissolved hydrogen water, wherein
   when the liquid containing body is present in the tank, the heater heats the dissolved hydrogen water to a first temperature, and
   when the liquid containing body is absent in the tank, the heater heats the dissolved hydrogen water to a second temperature higher than the first temperature.

3. The hydrogen addition device according to claim 1, wherein the hydrogen water generator increases a dissolved hydrogen concentration of the dissolved hydrogen water while circulating the dissolved hydrogen water to and from the tank.

4. The hydrogen addition device according to claim 3, wherein
   the hydrogen water generator and the heater are configured so that the increase in the dissolved hydrogen concentration of the dissolved hydrogen water by the hydrogen water generator and the heating of the dissolved hydrogen water by the heater are performable simultaneously, at least in part of the time.

5. The hydrogen addition device according to claim 1, further comprising
   a display portion controlled by the control to display information about whether the drainage tank is full.

6. The hydrogen addition device according to claim 1 wherein,
   the drainage tank is provided, on the front side of the drainage tank, with a handle for pulling out it from the housing.

7. The hydrogen addition device according to claim 1 further comprising
   a detector for detecting the presence or absence of the liquid containing body in the tank, and outputting electrical signals to the controller regarding the presence or absence of the liquid containing body, and
   the controller controls the heater based on the electrical signals from the detector such that
      when the liquid containing body is present in the tank, the heater heats the dissolved hydrogen water to the first temperature approximating a body temperature of a living body, and
      when the liquid containing body is absent in the tank, the heater heats the dissolved hydrogen water to the higher second temperature suitable for sterilization.

8. The hydrogen addition device according to claim 7, wherein
   the drainage tank is configured to be able to store the dissolved hydrogen water in the tank discharged after being used for sterilization.

* * * * *